US011704439B2

(12) United States Patent
Bonat et al.

(10) Patent No.: US 11,704,439 B2
(45) Date of Patent: Jul. 18, 2023

(54) SYSTEMS AND METHODS FOR MANAGING PRIVACY POLICIES USING MACHINE LEARNING

(71) Applicant: JPMORGAN CHASE BANK, N.A., New York, NY (US)

(72) Inventors: Michelle Bonat, New York, NY (US); Tuan Dao, Richardson, TX (US); Roderic Bachelor, San Carlos, CA (US); Jeremy F. Bennett, San Carlos, CA (US); Ralph Darmo, West Chester, CA (US); Andrew Grignon, Half Moon Bay, CA (US); Kathleen Moynahan, Oakland, CA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 306 days.

(21) Appl. No.: 16/890,991

(22) Filed: Jun. 2, 2020

(65) Prior Publication Data
US 2020/0380171 A1 Dec. 3, 2020

Related U.S. Application Data

(60) Provisional application No. 62/874,240, filed on Jul. 15, 2019, provisional application No. 62/856,491, filed on Jun. 3, 2019.

(51) Int. Cl.
*G06F 21/62* (2013.01)
*G06N 20/00* (2019.01)
(Continued)

(52) U.S. Cl.
CPC ........ *G06F 21/6263* (2013.01); *G06F 16/955* (2019.01); *G06F 21/602* (2013.01);
(Continued)

(58) Field of Classification Search
CPC .................................................. G06F 21/6263
See application file for complete search history.

(56) References Cited

U.S. PATENT DOCUMENTS 9,060,031 B1 6/2015 Taylor et al.
2012/0185947 A1 7/2012 Phillips et al.
(Continued)

FOREIGN PATENT DOCUMENTS

CA 2775427 10/2012

OTHER PUBLICATIONS

International Search Report, dated Sep. 16, 2020, from corresponding International Application No. PCT/US2020/035024.
(Continued)

*Primary Examiner* — Simon P Kanaan
(74) *Attorney, Agent, or Firm* — Greenberg Traurig LLP

(57) ABSTRACT

Systems, methods, and devices for managing privacy policies are disclosed. In one embodiment, a method for management of a user's privacy preferences may include: identifying a computer application installed on a user electronic device, or a website accessed using a browser executed by the user electronic device; retrieving a privacy policy document analysis for a privacy policy document associated with the computer application or the website, the privacy policy document analysis comprising a valuation of a plurality of privacy policy segments within the privacy policy document; receiving a privacy preference analysis for the user, the privacy preference analysis comprising a valuation of a plurality of privacy preferences for the user; identifying a recommended action in response to the valuation of one of the privacy policy segments being outside the scope of the valuation of one of the plurality of privacy preferences; and executing the recommended action.

18 Claims, 3 Drawing Sheets

(51) Int. Cl.

| | |
|---|---|
| *G06F 40/279* | (2020.01) |
| *H04W 12/02* | (2009.01) |
| *G06F 16/955* | (2019.01) |
| *G06F 21/60* | (2013.01) |
| *H04L 9/32* | (2006.01) |
| *H04L 9/40* | (2022.01) |
| *G01S 19/42* | (2010.01) |
| *H04L 67/02* | (2022.01) |
| *H04L 61/5007* | (2022.01) |

(52) U.S. Cl.
CPC ........ *G06F 21/6254* (2013.01); *G06F 40/279* (2020.01); *G06N 20/00* (2019.01); *H04L 9/3213* (2013.01); *H04L 63/1425* (2013.01); *H04L 63/20* (2013.01); *H04W 12/02* (2013.01); *G01S 19/42* (2013.01); *G06F 2221/2149* (2013.01); *H04L 61/5007* (2022.05); *H04L 67/02* (2013.01)

(56) References Cited

U.S. PATENT DOCUMENTS

| | | | |
|---|---|---|---|
| 2012/0240237 A1 | 9/2012 | Kanevsky et al. | |
| 2012/0331567 A1* | 12/2012 | Shelton | G06Q 10/00 726/28 |
| 2014/0129670 A1 | 5/2014 | Oliver | |
| 2015/0180902 A1* | 6/2015 | Biswas | H04W 12/08 726/1 |
| 2016/0140353 A1* | 5/2016 | Biswas | G06F 21/62 726/1 |
| 2016/0164915 A1 | 6/2016 | Cook | |
| 2017/0193624 A1 | 7/2017 | Tsai | |
| 2017/0255792 A1* | 9/2017 | Kim | G06F 21/6245 |
| 2017/0357827 A1 | 12/2017 | Shoa | |
| 2018/0083843 A1 | 3/2018 | Sambandam | |

OTHER PUBLICATIONS

Written Opinion of the International Searching Authority, dated Sep. 16, 2020, from corresponding International Application No. PCT/US2020/035024.

International Search Report, dated Sep. 10, 2020, from corresponding International Application No. PCT/US2020/035777.

Written Opinion of the International Searching Authority, dated Sep. 10, 2020, from corresponding International Application No. PCT/US2020/035777.

International Search Report, dated Sep. 14, 2020, from corresponding International Application No. PCT/US2020/035393.

Written Opinion of the International Searching Authority, dated Sep. 14, 2020, from corresponding International Application No. PCT/US2020/035393.

Panopticlick, Panopticlick 3.0, Is your browser safe against tracking?, EFF: Electronic Frontier Foundation, Mar. 4, 2016.

Szymielewicz et al., The GDPR and Browser Fingerprinting: How it Changes the Game for the Sneakiest Web Trackers, EFF: Electronic Frontier Foundation, Jun. 19, 2108.

Multilogin, The Only Two Approaches to Combat Browser Fingerprinting, Multilogin.com, Blog, May 9, 2017.

Stockley, Browser fingerprints—the invisible cookies you can't delete, Naked Security, Sophos.com, Dec. 1, 2014.

Nikiforakis, Nick; et al., PriVaricator: Deceiving Fingerprinters with Little White Lies, MSR-TR-2014-26, Feb. 28, 2014.

Faizkhademi, Amin; et al., FPGuard: Detection and Prevention of Browser Fingerprinting, School of Computing, Queen's University, Kingston, Canada, Jul. 2015.

* cited by examiner

SYSTEMS AND METHODS FOR MANAGING PRIVACY POLICIES USING MACHINE LEARNING

RELATED APPLICATIONS

This application claims the benefit of, and priority to, U.S. Provisional Patent Application Ser. No. 62/856,491, filed Jun. 3, 2019 and U.S. Provisional Patent Application Ser. No. 62/874,240, filed Jul. 15, 2019. The disclosures of each of these applications is hereby incorporated, by reference, in its entirety.

BACKGROUND OF THE INVENTION

1. Field of the Invention

Embodiment disclosed herein are generally directed to systems and methods for managing privacy policies, such as those of third party websites, merchants, and application providers.

2. Description of the Related Art

Our digital and physical lives are increasingly linked to applications ("apps"), services and mobile devices we use every day. Individuals now interact with hundreds of companies and multitudes of people in ways that were previously unimaginable before the advent of mobile technologies. Privacy and identity data are often no longer under the control of the individual; the individual does not know who has these data, or how it is used.

Every person has a right to privacy and a digital identity that they own and control but they lack a trusted, simple way to preserve privacy. Everything we say, do and experience on our phones and online is tracked and controlled by other parties, and consumers are often unaware of what data are being collected and shared about them.

Consumers are growing increasingly concerned about privacy and security but do not act to protect themselves because they may not know what data are exposed or the implications of the exposure. They often choose convenience over privacy. For example, terms and conditions that a consumer must accept before using an app, a web service, etc. are lengthy and confusing. Consumers are, thus, unaware of what aspects of data and privacy they are sacrificing in exchange for using the app or service.

SUMMARY OF THE INVENTION

Systems, methods, and devices for managing privacy policies are disclosed. In one embodiment, in an information processing apparatus comprising at least one computer processor, a method for management of a user's privacy preferences may include: (1) identifying a computer application installed on a user electronic device, or a website accessed using a browser executed by the user electronic device; (2) retrieving a privacy policy document analysis for a privacy policy document associated with the computer application or the website, the privacy policy document analysis comprising a valuation of a plurality of privacy policy segments within the privacy policy document; (3) receiving a privacy preference analysis for the user, the privacy preference analysis comprising a valuation of a plurality of privacy preferences for the user; (4) identifying a recommended action in response to the valuation of one of the privacy policy segments being outside the scope of the valuation of one of the plurality of privacy preferences; and (5) executing the recommended action.

In one embodiment, a privacy policy manager executed on the electronic device may identify the computer application or website by examining network traffic to and from the electronic device.

In one embodiment, the privacy policy document analysis may be a result of natural language processing of the privacy policy document.

In one embodiment, each privacy policy segment may include a privacy category, a privacy sub-category, and a privacy sub-category classification.

In one embodiment, the valuation of the privacy policy segment may be based on at least one of the privacy sub-category and the privacy sub-category classification for the privacy policy segment.

In one embodiment, the valuation of the privacy policy segment may include a numeric score, a letter grade, a color code, etc.

In one embodiment, the method may further include modifying the valuation of the privacy policy segment based on an actual implementation of the privacy policy segment.

In one embodiment, the valuation of a plurality of privacy preference may be based on monitored user behavior.

In one embodiment, the recommended action may be to change the valuation of the user privacy preference, may be based on an action taken by a second user, may be based on news related to an entity associated with the computer application or website, may be to restrict use of the computer application or website, etc. In one embodiment, the restriction may be a restriction on personal identifiable data communicated from the electronic device.

In one embodiment, the recommended action may be generated using a machine learning process.

According to another embodiment, a system for management of a user's privacy preferences may include: an electronic device comprising at least one computer processor; a privacy policy manager program executed by a server; a privacy policy manager computer application executed by the electronic device; and a computer application or browser executed by the electronic device that accessed a website. The privacy policy manager computer application may identify the computer application or the website accessed using the browser; may retrieve, from the privacy policy manager program, a privacy policy document analysis for a privacy policy document associated with the computer application or the website, the privacy policy document analysis comprising a valuation of a plurality of privacy policy segments within the privacy policy document; may receive a privacy preference analysis for the user, the privacy preference analysis comprising a valuation of a plurality of privacy preferences for the user; may identify a recommended action in response to the valuation of one of the privacy policy segments being outside the scope of the valuation of one of the plurality of privacy preferences. The privacy policy manager computer application and/or the privacy policy manager program may execute the recommended action.

In one embodiment, the privacy policy manager computer application may identify the application or website by examining network traffic to and from the electronic device.

In one embodiment, the privacy policy manager program may generate the privacy policy document analysis using natural language processing of the privacy policy document.

In one embodiment, each privacy policy segment may include a privacy category, a privacy sub-category, and a privacy sub-category classification, and the valuation of the privacy policy segment may be based on at least one of the privacy sub-category and the privacy sub-category classification for the privacy policy segment.

In one embodiment, the recommended action may be based on at least one of an action taken by a second user, and news related to an entity associated with the application or website, may be to restrict personal identifiable data communicated from the electronic device, etc.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Figure 1:
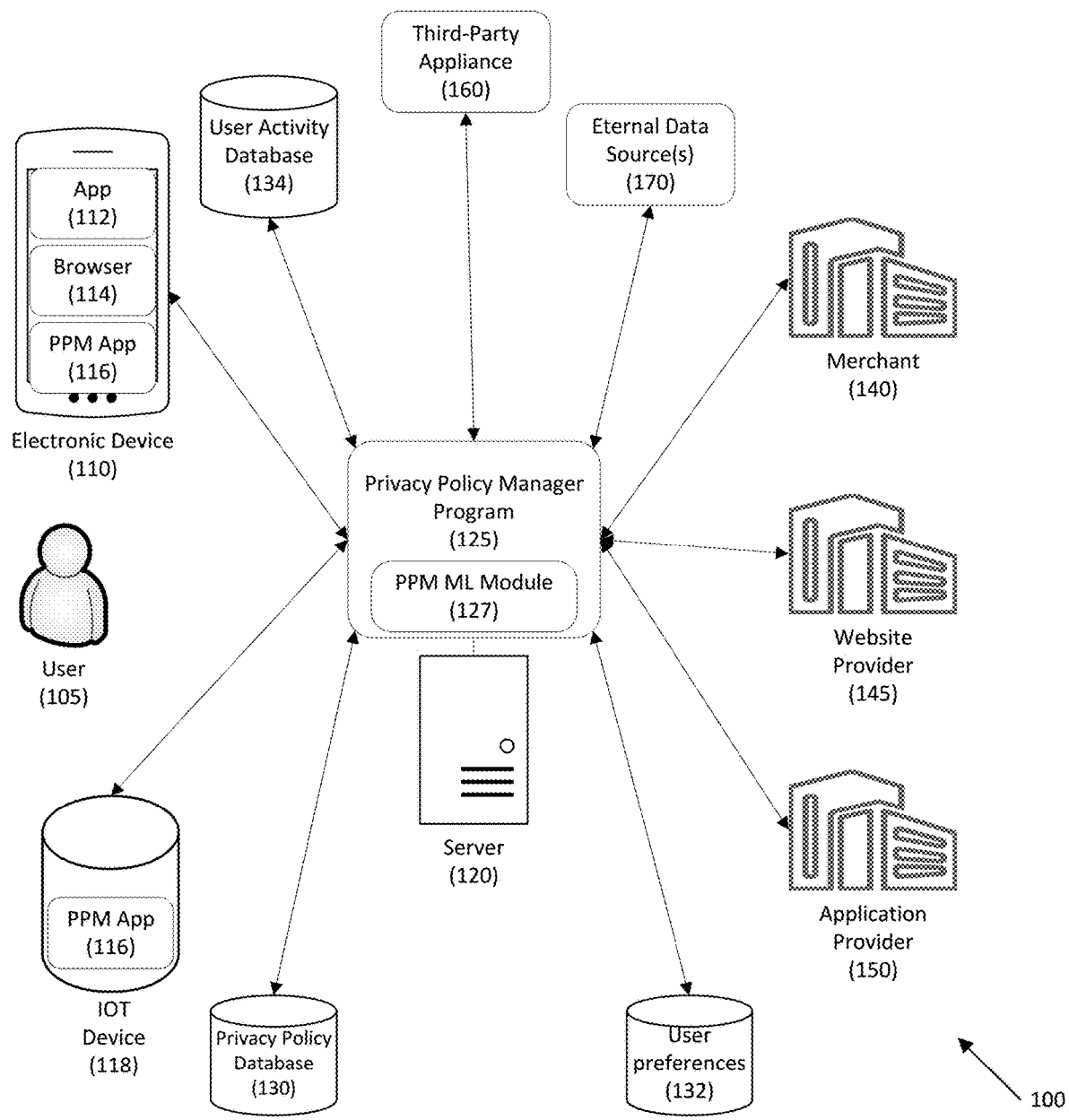
FIG. 1 discloses a system for privacy policy management according to one embodiment.

Systems and methods for privacy policy management are disclosed. Embodiments may provide a product and/or service that captures and/or alerts the consumer to privacy policy content and updates of third party applications, websites, organizations, etc. Embodiments may use, for example, manual entry, screen scraping, NLP (natural language processing), third party databases, etc. to capture privacy policies and present the consumer with an easy to understand list of the data points that the consumer has agreed to have collected by the third party. Embodiments may notify the consumer when privacy terms and conditions change, and may also inform or alert the consumer if third party is not abiding by its privacy policies, so that the consumer may delete the app, no longer visit the website, take legal action, etc. This may be achieved by monitoring the personal data leaving a mobile device (either on device or on network) that is being collected by a certain mobile application and comparing that to what the third-party states it is collecting.

In one embodiment, consumers may block certain data from leaving their electronic devices. For example, in response to receiving a notification, or for any other reason, a consumer may block certain data, such as personally identifiable information (PII) data, from being transmitted. In another embodiment, the consumer may allow other information to be transmitted. In another embodiment, the consumer may cause the certain information to be anonymized, redacted, obscured, etc. before being transmitted.

In one embodiment, the functionality of the privacy policy manager may be implemented by a privacy manager program or hub, discussed below.

In one embodiment, the privacy manager program, service, appliance, or application may maintain a database of terms and conditions for different apps, services, websites, etc. provided by app providers or website providers, and may periodically update the database as the terms and conditions change. In one embodiment, the privacy manager may retrieve the terms and conditions directly from the app providers or website providers, via an app store, by screen-scraping from the electronic devices, from third parties, crawling the websites, etc.

In one embodiment, a privacy policy manager program may interact with a privacy policy manager app that may be installed locally on one or more of the electronic devices. In another embodiment, a local privacy manager app may not be required.

In one embodiment, the privacy policy manager program may identify apps installed on the electronic devices, websites accessed by the electronic devices, and may generate a privacy indicator, such as a score or rating, based on the terms and conditions for the apps or websites. In another embodiment, the privacy policy manager program may monitor the traffic from the electronic devices to determine the apps that are being used and/or websites being accessed, and may generate a privacy score or rating. In still another embodiment, the privacy policy manager program may monitor the traffic from the electronic devices and generate a privacy score or rating based on the actual data being transmitted.

In one embodiment, the privacy policy manager may implement a freeze feature if it detects that a consumer's PII is being used without authorization. For example, the consumer's credit may be frozen in response to unauthorized access use of, misuse, etc. of a consumer's PII.

In one embodiment, the privacy policy manager program may provide alerts when the terms and conditions change, when an app provider or website provider is not using the data according to the terms and conditions, etc. For example, the alerts may be provided ty SMS, email, push notification, etc.

In one embodiment, the privacy policy manager program may provide a summary of the terms and conditions that the consumer is going to accept, or has accepted, for apps. For example, the summary may identify the type of data that the consumer is agreeing to share (e.g., the third party may read all email traffic, the third party may receive location information, etc.) so that the consumer may make an educated decision as to whether the consumer should download an app, use an app, website, or service, or discontinue usage of the app, website, or service. The summary may further provide a privacy score or rating for the app (e.g., 0-100, A-F, red-amber-green).

In one embodiment, the privacy policy manager program may block an app or website from communicating data to the app providers or website providers in response to a breach of the terms and conditions. In one embodiment, the consumer may override the blocking if desired.

Referring to FIG. 1, a system for privacy policy management is disclosed according to one embodiment. System 100 may include user 105, which may be an individual, a group of individuals, an organization, etc. User 105 may access an application (app) 112 provided by application provider 150, or may use browser 114 to access a website provided by website provider 145 using electronic device 110 and/or Internet of Things (IoT) device 118. Electronic device 110 may be any suitable electronic device, including computers (e.g., desktop computers, notebook computers, laptop computers, tablet computers, workstations, terminals, etc.), smart phones, etc. IoT device 118 may include, for example, smart watches, smart speakers, etc.

Electronic device 110 may further execute privacy policy manager (PPM) application 116, which may receive privacy preferences from user 105, may identify applications 112 on electronic device 110, may retrieve a browsing history using browser 114 on electronic device 110, may provide notifications, may take actions with one or more application 112 or browser 114, etc.

IoT device 118 may also execute PPM application 116.

Server 120 may execute privacy policy manager program 125. Server 120 may be a physical server, a cloud-based server, combinations thereof, etc.

Privacy policy manager program 125 may communicate with electronic device 110, IoT device 118 using, for example, PPM application 116. It may further include privacy policy manager machine learning (ML) module 127 that may employ machine learning and/or artificial intelligence to privacy policies of merchant 140, website provider 145, and/or application provider 150, as well privacy preferences and/or desired actions for user 105.

Privacy policy manager program 125 may communicate with one or more of merchant 140, website provider 145, and application provider 150 and may retrieve, for example, a privacy policy merchant 140, website provider 145, and/or application provider 150. In one embodiment, privacy policy manager program 125 may retrieve the privacy policies directly, or it may retrieve them from privacy policy database 130, which may be provided by a third party.

In one embodiment, the privacy policies of, for example, merchant 140, may be posted at a physical place of business.

The privacy policies of merchant 140, website provider 145, and/or application provider may specify the policy for personal identifiable information (PII) collection, retention, and sharing. Any other privacy policy information may be considered as is necessary and/or desired.

User preferences database 132 may store preferences for user 105 and other users regarding the collection, retention, and sharing of PII. In one embodiment, user preferences database 132 may further specify preferred actions to take for user 105 in response to a change in a privacy policy, a breach of a privacy policy, etc.

User activity database 134 may store user activities, such as application usage history, browsing history, past recommendations/actions, any ratings or classifications of the applications, websites, etc. Any other activities may be stored as is necessary and/or desired.

Third-party appliance 160 may provide user activity data and ratings of apps and websites, etc.

External data source(s) 170 may provide privacy policy manager program 125 with dynamic information on the entity's privacy policies, including information on breaches, industry praise or concerns, etc. The dynamic information may be provided within a certain trailing time period, and/or within a general category of information, such as user activity data and ratings of apps and websites, business news, industry praise or concerns, etc.

Figure 2:
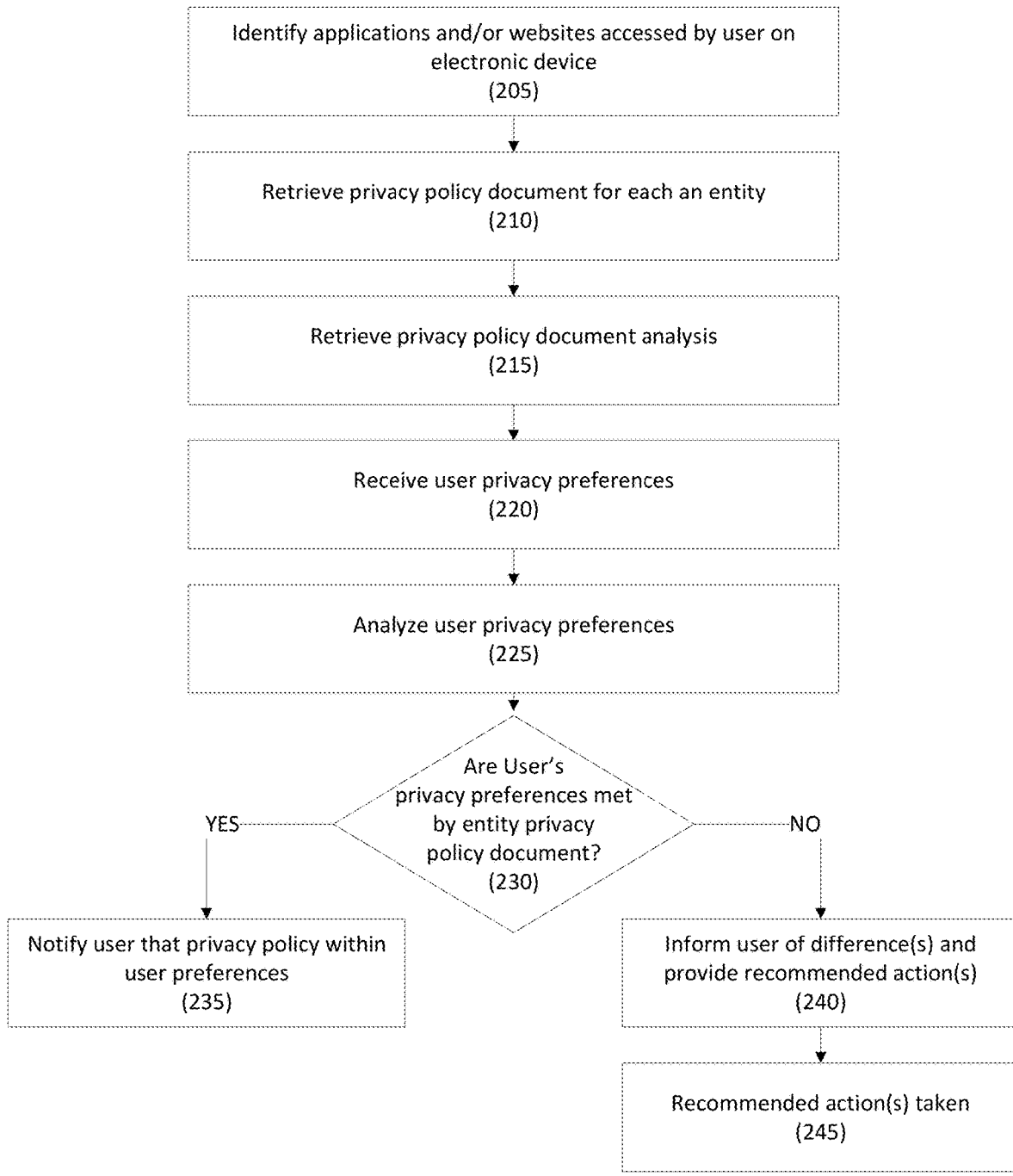
FIG. 2 discloses a method for privacy policy management device according to one embodiment.

Referring to FIG. 2, a method for privacy policy management is provided according to one embodiment.

In step 205, applications used and/or a browsing history for a user may be identified. For example, a privacy policy manager application executed on the electronic device or IoT device may identify installed and/or used applications and programs on the electronic device or IoT device, and may retrieve the browsing history to identify websites that have been accessed using the electronic device or IoT device. From the applications and browsing history, a merchant, website provider, and/or application provider with which the electronic device or IoT device may share PII information.

In another embodiment, a centralized privacy policy manager program may receive traffic from an electronic device or IoT device that is bound for a merchant, website provider, and application provider, and may identify the merchant, website provider, and/or application provider.

In one embodiment, application and/or browser data may be received by a network monitor, device management software, a system monitor running on the user's electronic device, and/or IoT device, by processing device logs, etc. In one embodiment, the user's network traffic may be examined, IP addresses may be inferred, DNS requests and responses may be inferred, proxy logs may be examined, combinations of these, etc.

Examining network traffic directly, inferring from IP addresses, inferring by monitoring DNS requests and responses, examining proxy logs. Other techniques for identifying applications and or websites may be used as is necessary and/or desired.

In step 210, a privacy policy document for the merchant, website provider, and/or application provider that host the website or application, or retrieve information from the browser or application, may be retrieved. In one embodiment, the privacy policy document may be downloaded from the merchant, website provider, and/or application provider, may be collected by screen scraping, etc. In one embodiment, the privacy policy document may be retrieved from a third party.

In one embodiment, the merchant, website, and/or application provider may have several privacy policies that collectively form its privacy policy document. Each privacy policy, or segments (e.g., portions) of the privacy policy document may include specific actions that the entity may take with PII data. For example, the privacy policy document may include privacy policy categories, such as PII collection, PII retention, PII usage, PII sharing, etc.

In one embodiment, the privacy policy categories in the privacy policy document may be identified by a human, may be identified automatically by crawling a website of the merchant, website provider, and/or application provider, etc.

In one embodiment, the actual manner in which an entity applies its privacy policy document, or privacy policies, may be considered. For example, an entity may have stated restrictive privacy policies, but in practice, implements unrestrictive privacy policies. The privacy policies and actual implementation may be considered together, given different weights, etc.

In one embodiment, if the privacy policy document is new or has changed, the privacy policy document may be retrieved and stored in a privacy policy database.

In step 215, the privacy policy document analysis may be retrieved. In one embodiment, the privacy policy document analysis may identify a plurality of privacy policy categories and a quantification of that privacy policy for comparison to similar categories of user privacy preferences.

In one embodiment, the privacy policy document analysis may be generated manually. In another embodiment, the privacy policy document analysis may be generated using natural language processing. In another embodiment, the privacy policy analysis may be received from a database, a third party, etc.

Any suitable manner of generating the privacy policy document analysis may be used as is necessary and/or desired.

Figure 3:
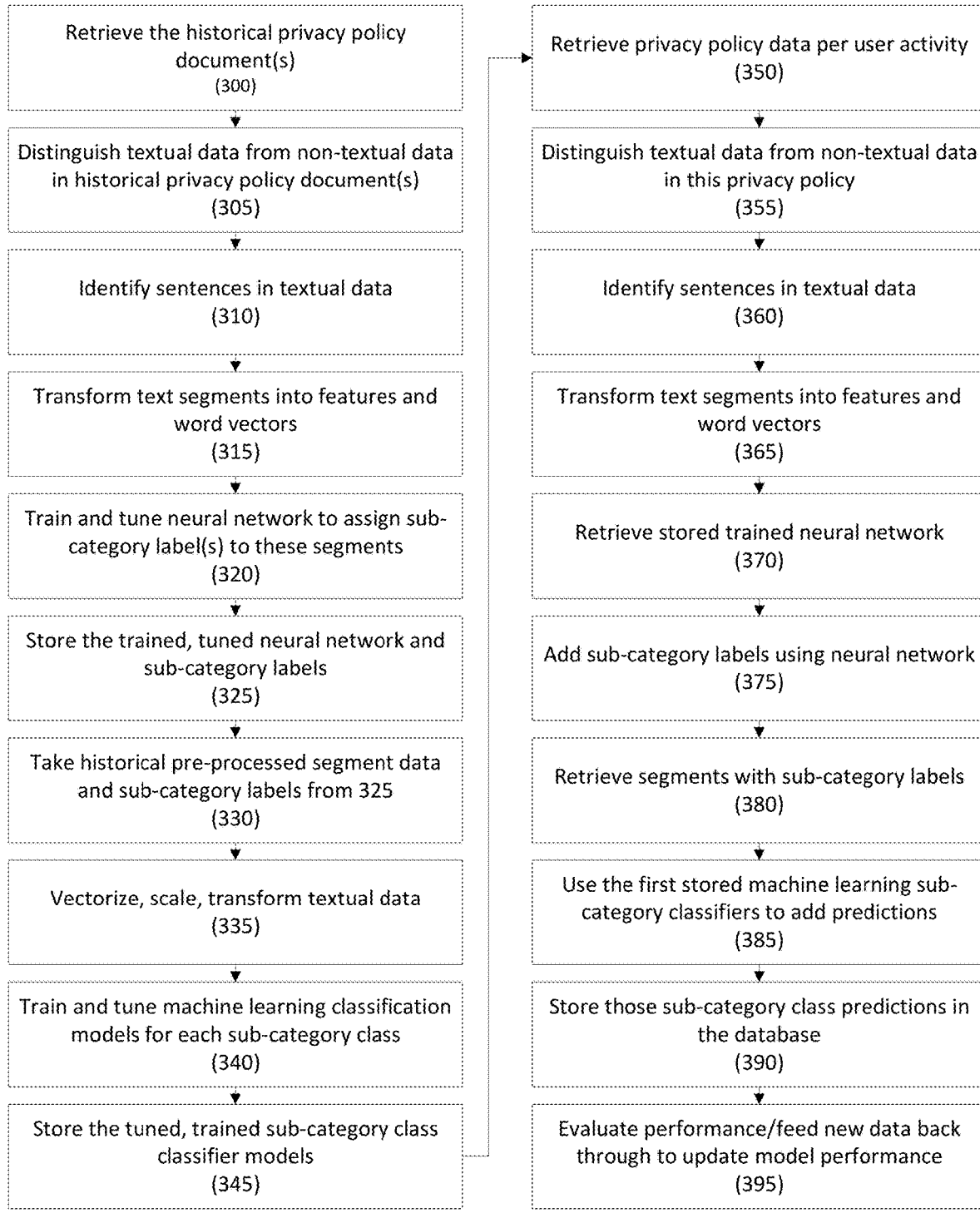
FIG. 3 depicts a method for natural language processing of a privacy policy document according to one embodiment.

In one embodiment, natural language processing may be used to analyze an entity's privacy policy document. Referring to FIG. 3, a method for generating a privacy policy document analysis using natural language processing is disclosed according to one embodiment. In general, the privacy policy document may be segmented, and annotated with a plurality of sub-category labels using a first natural language process. The results of the first natural language processing process may be provided to a second natural language processing process, which generates a prediction for a classification for the specific types of sub-categories on these segments. From a procedural perspective, each of these separate natural language processing processes are trained and tuned with a collection of historical data, stored, and then called on the new data when a user interaction requires that a specific privacy policy document or privacy policy be analyzed. Examples include when a new privacy policy document is identified, when a known privacy policy document or privacy policy has been updated or changed, when a user changes its privacy preferences, etc.

In step 300, historical privacy policy documents for the entity may be retrieved. In one embodiment, the historical privacy policy documents may be prior versions of the current privacy policy document for the entity. The historical privacy policy documents may be retrieved from a database.

In step 305, the privacy policy document may be processed to distinguish textual data from non-textual data. For example, a privacy policy manager machine learning engine may use one or more character recognition algorithms to identify and distinguish textual data and non-textual data content in the historical privacy policy documents used for training, although other manners of identifying the textual data and/or non-textual data may be used as is necessary and/or desired. Examples of non-textual content include graphical images, punctuation marks (e.g., periods, commas, parentheses, etc.), numerical digits, etc. Textual content may include words and letters, etc.

In step 310, the privacy policy manager machine learning engine may separate the contents of the privacy policy documents into segments that may be used for training. For example, in one embodiment, the privacy policy manager machine learning engine may identify a first period mark, and then identify the words before the first period mark as a first sentence. The privacy policy manager machine learning engine may then identify the next, or second, period mark and identify the words between the first period mark and the second period mark as a second sentence, etc. Any other suitable method of identifying segments may be used as is necessary and/or desired.

In step 315, the privacy policy manager machine learning engine may transform the segments of text into features and into corresponding word vectors. A feature may be considered to be an individual measurable property or characteristic that may be used for analysis. For example, each common word may be detected and transformed into a target variable using one-hot encoding. A vector may include a list of values, or a row in a table, or similar ways of representing data. In one embodiment, the privacy policy manager may create a feature vocabulary for the most common words, and may store the vocabulary in the data storage, where, for example, the frequency of occurrence of each word may be used as a feature for training a classifier. The privacy policy manager machine learning engine may also transform each of the most common word features in the vocabulary to a vector of floating point numbers, called a word vector, and may store the word vector.

In one embodiment, the word vectors may be used in assigning a score, rating, or value to the privacy policy segments.

In step 320, the privacy policy manager machine learning engine may then use a neural network, or any other suitable type of machine learning model, to assign sub-category labels to these segments, where each segment can have more than one sub-category label ("multi-label"). Examples of suitable neural networks may include an RNN (recurrent neural network), a CNN (convolutional neural network), combinations thereof, etc.

For example, types of sub-category labels may refer to: how the data is collected, why it is stored, what choices the user has to manage their data, what the entity can specifically use the data for, etc. Exemplary sub-category labels may include "Audience Type," "Access Scope," "Access Type," "Action First-Party," "Action Third-Party," "Change Type," "Choice Scope," "Choice Type," "Collection Mode," "Do Not Track," "Does/Does Not," "Identifiability," "Notification Type," "Other Type," "Personal Information Type," "Purpose," "Retention Period," "Retention Purpose," "Security Measure," "Third-Party Entity," "User Choice," and "User Type." It should be noted that these sub-category labels are exemplary only and additional, fewer, different, other, etc. sub-category labels may be used as is necessary and/or desired.

In one embodiment, the privacy policy category label may be determined from the sub-category label. For example, each sub-category label may be associated with a single category, so the category label may be determined from the sub-category label. Examples of category labels include: policy change (e.g., if and how users will be informed about changes to the privacy policy); first party collection/use (e.g., how and why a service provider collects user information); data retention (e.g., how long user information is stored); international and specific audiences (e.g., practices that pertain only to a specific group of users, such as children, residents of the EU or California, etc.); third party sharing/collection (e.g., when user information may be shared with or collected by third parties); user choice/control (e.g., choices and control options available to users); user access, edit and deletion (e.g., if and how users can access, edit, or delete their information); data security (e.g., how user information is protected); do not track (e.g., if and how users will be informed about changes to the privacy policy); and other (e.g., additional privacy-related information not covered by the other categories). Additional, fewer, and different category labels may be used as is necessary and/or desired.

A RNN type neural network may leverage internal memory that allows the previous inputs to affect the subsequent predictions, thus making the prediction more accurate.

A CNN type neural network may include an input layer, interim convolutional and fully connected layers, and an output layer. The input layer may receive the word vectors extracted from the textual input as vector embeddings, bag-of-words, etc. The interim convolutional and fully connected layers may extract useful features from the input features. The output layer may output the relevance probability for each of the publications.

Deep learning, a combination of many processing layers working together, may be used to progressively extract higher level features from the data. These results may be fed into the trained neural network. Multiple hidden layers may be used to enhance performance, especially as the amount of data increases.

In one embodiment, the privacy policy manager machine learning engine may perform "back propagation," or training, to generate the trained neural network using, for example, vector embeddings based on the word vectors or one-hot encoding using a bag-of-words technique, etc. For example, this training may be achieved by applying a gradient descent routine that iteratively attempts to minimize a loss function that quantifies the discrepancies between the manual labels and model prediction. This loss function may focus on optimizing the accuracy, recall, precision, etc. of the model.

Upon completion of the training, the privacy policy manager machine learning engine may update the initial weights assigned to the neural network parameters, resulting in trained weights.

In step 325, the privacy policy manager machine learning engine may store the trained neural network. The trained neural network may be stored in the privacy policy database as, for example, a Python object, or any other suitable object in another programming language. The trained neural network may be updated using retraining, which may be based on manual-labeled privacy policies.

In step 330, the historical pre-processed segment data and sub-category labels are retrieved from the database.

For example, in step 335, the text segments may be vectorized, scaled, and transformed. The vectorization may be in a manner similar to that described above. Scaling may involve transforming the vectors such that its distribution will have a mean value of 0 and a standard deviation of 1. In one embodiment, scaling may be used with various machine learning models but not with other machine learning models, as appropriate. For example, Decision Trees, Support Vector Machine, and Logistic Regression can benefit from scaled data, but Naïve Bayes may not benefit from scaled data.

The scaled data may be transformed by adding a statistical weighting for how important a word is to a document in the collection.

In step 340, multiple separate machine learning models may be trained for each sub-category class in order to predict a value for the privacy policy sub-category classes. In step 345 the trained and tuned machine learning models may be stored in the database.

In step 350, the specific privacy policy is retrieved based on user activity, based on the process outlined previously. For example, the current privacy policy document for the entity may be retrieved and checked to see if it has been updated from a prior retrieval. If it has been updated, modified, changed, etc. in steps 355, 360, and 365 the textual content is processed based on the methods described previously, to prepare at for processing by the neural network.

For example, in step 355, textual data may be distinguished from non-textual data. In step 360, sentences in the textual data may be identified. In step 365, tagged words may be transformed into word features and word vectors.

In step 370, the stored neural network may be retrieved, and using those models, in step 375, sub-category labels may be added, and the output is stored in the database in a method similar to what was described previously.

In step 380, the output of the trained neural network for that specific privacy policy (i.e., the segments with their associated sub-category labels) may be retrieved so that it may be used with a second natural language processing process.

In step 385, the stored machine learning models may be called and applied to their respective sub-category label segments and classification probabilities for privacy policy documents using machine learning models ("multi-class") are predicted. In step 390, the results may be stored in a database for comparison to a user's privacy preferences.

In one embodiment, the classifications for the sub-category labels may be used in assigning a score, rating, or value to the privacy policy segments.

For example, if the segment has been labeled as belonging to the sub-category "Retention Purpose," the model for retention purpose would be called on this segment to predict the sub-category classifications for "Retention Purpose."

In step 395, the results of the sub-category label and the sub-category classifications provided by the various machine learning models may be evaluated, and the results of this evaluation are fed back into the relevant parts of the processes outlined above which may result in updated model performance. For example, the output may be fed back as an input to further train and tune the neural network in step 320 and/or step 340.

These evaluations may be provided in any suitable manner, including by humans (e.g., by manual comparison), by machine learning (e.g., by evaluating the performance with defined metrics), or by a combination thereof.

For example, if a text segment is labelled with the sub-category label of "Retention Purpose," the output of the second natural language processing process may be probabilities of what type of data retention is being mentioned, which refers to why they are keeping the user's data. As another example, if a text segment is labelled with the sub-category label of "Retention Period", the output of the second natural language processing process may be the probabilities of how long the user's data may be retained.

As another example, if a text segment from a privacy policy is "because we are required to do this by the government," the output of the second natural language processing process may return "Probability=99% Legal Requirement, 1% Perform Services, 0% Advertising, 0% Analytics/Research, 0% Other, 0% Perform Service"). The probabilities for each class in that one category is returned together this is why it is called "multi-class."

Each privacy policy segment in the privacy policy document may be scored, rated, or otherwise quantified for a comparison to the user's privacy preferences. For example, each privacy policy segment may be assigned a score, rating, or a value based on how restrictive it is (e.g., from the perspective of the user), the amount of risk to the user, etc. Examples include a score of 1-3, 1-10, 1-100, etc.; a grade from A-F, a color rating (e.g., red-amber-green), etc. Any suitable valuation scheme may be used as is necessary and/or desired. In one embodiment, the valuation or scoring scheme may be selected based on the manner in which the user's privacy preferences are collected and/or analyzed to facilitate a comparison.

In one embodiment, the word vectors and/or sub-category classifications may be used to score, rate, or value the privacy policy segments.

In another embodiment, the value or classification may be from the perspective of the entity, such as a sentiment analysis of the news related to the underlying entity.

In another embodiment, other elements related to the specific privacy policy content, or impacting the underlying entity related to the privacy policy that may affect how a user could evaluate their interaction with the entity and the entity's use of the user's data, may be used as is necessary and/or desired.

The perspective used for valuation or classification should be the same for both the privacy policy segments and the user's privacy preferences.

In step 220, the user's privacy preferences may be received. In one embodiment, the user may specify privacy preferences related to an entity's use of the user's PII, such as PII collection, PII retention, and/or PII sharing, how the user can access the user's PII data, security used to protect the PII data, tracking activities on the PII data, alerts related to access to the PII data, etc. using, for example, a privacy manager application executed on the user's electronic device and/or IoT device. If the user has multiple electronic devices or IoT devices, each device may have a separate privacy preference, or multiple devices may share the same privacy preferences.

In one embodiment, the user privacy preferences may be manually entered by the user. For example, the user may be provided a list of possible entity actions involving PII data and may select allow, disallow, don't care, etc. In another embodiment, the user's privacy preferences may be based on or derived from user behavior. For example, if the user uses a browser in private mode, that activity may inform the user's privacy preferences. In another embodiment, the privacy preferences may be based on the privacy preferences of similarly-situated users. For example, the privacy preferences of others may be used as a starting point for further refining the privacy preferences. In another embodiment, machine learning may be used to determine the user's privacy preferences. Any other suitable mechanism for assessing or collecting a user's privacy preferences may be used as is necessary and/or desired.

Combinations of two or more of these techniques, as well as additional techniques, may be used as is necessary and/or desired.

In step 225, the user's privacy preferences may be analyzed by, for example, translating them into machine readable data structures. For example, the user's privacy preferences may be scored, rated, or assigned a value in a manner similar to the way that the entity's privacy policy segment were scored or rated in order to facilitate a comparison. This includes scoring from the same perspective as used in scoring the privacy policy segments.

In step 230, the user's privacy preferences may be compared to the privacy policy segments for the entity to determine if the user's privacy preferences are met by the entity's privacy policy segment and/or overall privacy policy. This check may be performed whenever a change in one of the entity's privacy policies is detected, periodically (e.g., monthly, weekly, daily, etc.), whenever a PII leak for the user is suspected, on demand, or as otherwise necessary and/or desired.

For example, for each privacy policy segment that has been assigned a value or otherwise quantified, the privacy policy segment may be compared to the user's preference for that privacy policy segment. For example, the value assigned to the privacy policy segment may be compared to the user's privacy preference that is relevant to that segment. If, in step 235, the privacy policy segment is within the scope of the user's privacy preferences, the privacy policy manager may notify the user of such. In one embodiment, the notification may be a push notification to the user's mobile electronic device, a text (e.g., SMS message), an email, a banner, a notification within the privacy manager application, etc.

In one embodiment, the privacy policy segment may be within the scope of the user's privacy preferences when the privacy policy is at least as restrictive as the user's privacy preferences.

In step 240, if the privacy policy segment is not within the scope of the user's privacy preferences, the privacy policy manager may notify the user of the differences, and may provide recommendations on action(s) to be taken. Examples of recommended actions may include no longer accessing or using the entity's website or application, using a private browser, deleting the application, changing the user's privacy preferences, etc.

For example, the recommended action may be based on actions that similarly-situated users have taken, knowledge of the entity, the manner in which the entity applies its privacy policy, user preferences, the entity's privacy history, such as how the entity's privacy policies have been updated over time, what breaches may have occurred, positive and/or negative news related to privacy practices of the entity, etc., how the entity's privacy policy compares to those of similar entities and/or an industry standard, combinations thereof, etc. In one embodiment, a weighting may be given to each consideration.

In one embodiment, the user's privacy preferences may be compared to similar users along aspects such as level of activity, preferences along certain categories, and other attributes (e.g., location, age, and other demographic data), which may result in insights and recommendations and ways to improve the user's privacy preferences. For example, if the user's privacy preferences are overly restrictive, the recommendation may be to allow the user to permit the privacy policy manager to override certain restrictions if the user wishes to continue to access the application or website provided by the entity. In one embodiment, privacy policy manager may require user permission to make any changes to the user's privacy preferences.

In one embodiment, the recommended actions may be applied to the privacy policy using, for example, machine learning model and data engineering approaches such as nearest neighbors, shortest path to optimization, clustering, principal component analysis (PCA), etc. to approximate one or more recommendation having the greatest certainty of arriving at the user's desired state.

In step 245, if the user has enabled automatic actions to be taken, or if the user approves the recommended action, the recommended action may be executed by the privacy policy manager and/or the privacy policy application. In one embodiment, the user's acceptance or rejection of the action may be provided to a machine learning model that may then adjust the user's privacy preferences and/or actions to be taken. In addition, the outcome of the action taken, such as whether additional actions were needed, etc. may be considered.

In one embodiment, the privacy policy manager and/or the privacy policy application may instruct a separate device to take the recommended action.

In one embodiment, the feedback may be used to update the privacy policy segment assessment, update the user's privacy preferences, and/or update the recommended action. For example, if the user accepts the recommended action, this may indicate that the privacy policy segment assessment, the user's privacy preferences, and/or the recommended action are likely correct and/or functioning properly. If the user rejects the recommended action, this may indicate that the privacy policy segment assessment, the user's privacy preferences, and/or the recommended action are likely incorrect and/or not functioning properly. For example, the privacy policy segment assessment may not be giving a correct valuation to the privacy policy segment. As another example, the user's privacy preferences may be set to be too restrictive. As still another example, the recommendation may be more restrictive than is appropriate for the user and/or situation.

In one embodiment, the feedback may be used to allow the predicted outputs for the models for privacy policy segment valuation, user privacy preference assessment, and/or recommended action to be reused to train updated versions of the models. These feedback loops may be manual (e.g., where humans review the output, determine if it is correct, and enter that correct value into a database. The human can be the user who is interacting within the system (was this choice correct for you? Y/N) or an expert user that reviews the output of an ML prediction and of a user recommendation); automated, such as with active learning (e.g., where a learning algorithm may interactively query the user), reinforcement learning (e.g., where a learning algorithm is put into interactive environment by trial and error using feedback from its own actions and experiences), combinations thereof, etc. The algorithms (e.g., for privacy policy segment valuation, user privacy preference assessment, and/or recommended action) may be updated using this new labeled data.

Although multiple embodiments have been disclosed, it should be recognized that these embodiments are not mutually exclusive and features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as an FPGA, PLD, PLA or PAL, or any other device or arrangement of devices that are capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler, or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, dBase, Forth, Html, Java, Modula-2, Pascal, Prolog, Python, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications, or equivalent arrangements.

What is claimed is:

1. A method for management of a user's privacy preferences, comprising:
   in an information processing apparatus comprising at least one computer processor:
   identifying a computer application installed on a user electronic device, or a website accessed using a browser executed by the user electronic device by examining network traffic to and from the user electronic device via a network monitor separate from the user electronic device;
   retrieving a privacy policy document analysis for a privacy policy document associated with the computer application or the website, the privacy policy document analysis comprising a valuation of a plurality of privacy policy segments within the privacy policy document;
   receiving a privacy preference analysis for the user, the privacy preference analysis comprising a valuation of a plurality of privacy preferences for the user;
   identifying a recommended action in response to the valuation of one of the privacy policy segments being outside the scope of the valuation of one of the plurality of privacy preferences; and
   executing the recommended action.

2. The method of claim 1, wherein the privacy policy document analysis is a result of natural language processing of the privacy policy document.

3. The method of claim 1, wherein each privacy policy segment comprises a privacy category, a privacy sub-category, and a privacy sub-category classification.

4. The method of claim 3, wherein the valuation of the privacy policy segment is based on at least one of the privacy sub-category and the privacy sub-category classification for the privacy policy segment.

5. The method of claim 1, wherein the valuation of the privacy policy segment comprises a numeric score, a letter grade, or a color code.

6. The method of claim 1, further comprising:
modifying the valuation of the privacy policy segment based on an actual implementation of the privacy policy segment.

7. The method of claim 1, wherein the valuation of a plurality of privacy preference is based on monitored user behavior.

8. The method of claim 1, wherein the recommended action is to change the valuation of the user privacy preference.

9. The method of claim 1, wherein the recommended action is based on an action taken by a second user.

10. The method of claim 1, wherein the recommended action is based on news related to an entity associated with the computer application or website.

11. The method of claim 1, wherein the recommendation is to restrict use of the computer application or website.

12. The method of claim 11, wherein the restriction is a restriction on personal identifiable data communicated from the electronic device.

13. The method of claim 1, wherein the recommended action is generated using a machine learning process.

14. A system for management of a user's privacy preferences, comprising:
an electronic device comprising at least one computer processor;
a privacy policy manager program executed by a server;
a privacy policy manager computer application executed by the electronic device; and
a computer application or browser executed by the electronic device that accessed a website;
wherein:

the privacy policy manager computer application identifies the computer application or the website accessed using the browser by examining network traffic to and from the electronic device via a network monitor separate from the user electronic device;

the privacy policy manager computer application retrieves, from the privacy policy manager program, a privacy policy document analysis for a privacy policy document associated with the computer application or the website, the privacy policy document analysis comprising a valuation of a plurality of privacy policy segments within the privacy policy document;

the privacy policy manager computer application receives a privacy preference analysis for the user, the privacy preference analysis comprising a valuation of a plurality of privacy preferences for the user;

the privacy policy manager computer application identifies a recommended action in response to the valuation of one of the privacy policy segments being outside the scope of the valuation of one of the plurality of privacy preferences; and the privacy policy manager computer application executes the recommended action.

15. The system of claim 14, wherein the privacy policy manager program generates the privacy policy document analysis using natural language processing of the privacy policy document.

16. The system of claim 14, wherein each privacy policy segment comprises a privacy category, a privacy sub-category, and a privacy sub-category classification, and the valuation of the privacy policy segment is based on at least one of the privacy sub-category and the privacy sub-category classification for the privacy policy segment.

17. The system of claim 14, wherein the recommended action is based on at least one of an action taken by a second user and news related to an entity associated with the application or website.

18. The system of claim 14, wherein the recommendation is to restrict personal identifiable data communicated from the electronic device.

* * * * *